United States Patent
Kawamoto et al.

(10) Patent No.: US 10,158,228 B2
(45) Date of Patent: Dec. 18, 2018

(54) POWER SUPPLY DEVICE, METHOD OF SUPPLYING POWER, AND POWER SUPPLY SYSTEM

(71) Applicant: Sony Corporation, Tokyo (JP)

(72) Inventors: Daisuke Kawamoto, Tokyo (JP); Tadashi Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 103 days.

(21) Appl. No.: 15/501,024

(22) PCT Filed: Jul. 31, 2015

(86) PCT No.: PCT/JP2015/003891
§ 371 (c)(1),
(2) Date: Feb. 1, 2017

(87) PCT Pub. No.: WO2016/021174
PCT Pub. Date: Feb. 11, 2016

(65) Prior Publication Data
US 2017/0229861 A1 Aug. 10, 2017

(30) Foreign Application Priority Data
Aug. 8, 2014 (JP) ................................. 2014-162362

(51) Int. Cl.
*H02J 1/10* (2006.01)
*G06F 1/26* (2006.01)
(Continued)

(52) U.S. Cl.
CPC ................ *H02J 1/10* (2013.01); *G06F 1/263* (2013.01); *G06F 1/266* (2013.01); *H02J 1/108* (2013.01);
(Continued)

(58) Field of Classification Search
CPC ........ Y04S 20/12; Y04S 10/123; Y02E 40/72; Y02B 90/222; Y02B 10/72; G06F 1/266;
(Continued)

(56) References Cited

U.S. PATENT DOCUMENTS 9,543,763 B2  1/2017 Sako et al.
2005/0156432 A1  7/2005 Hennessy
(Continued)

FOREIGN PATENT DOCUMENTS

CN  102545200 A  7/2012
EP  2 061 131 A1  5/2009
(Continued)

OTHER PUBLICATIONS

Abe et al., Digital Grid: Communicative Electrical Grids of the Future, IEEE Transactions on Smart Grid, vol. 2, No. 2, Jun. 2011, pp. 399-410.
(Continued)

*Primary Examiner* — Robert Deberadinis
(74) *Attorney, Agent, or Firm* — Wolf, Greenfield & Sacks, P.C.

(57) ABSTRACT

In one embodiment, there is provided a power interchange system for distributing direct current (DC) electrical power. The power interchange system comprises a plurality of nodes comprising a first node and a second node. The first node comprises a first communication device and a first power source to power the first communication device. The second node comprises a second communication device and a second power source to power the second communication device. The power interchange system further comprises a wired cable connecting the first node and the second node. The wired cable comprises at least one first wire to convey DC power from the first power source of the first node to the second node to power the second communication device or
(Continued)

from the second power source of the second node to the first node to power the first communication device.

22 Claims, 11 Drawing Sheets

(51) Int. Cl.
*H02J 7/34* (2006.01)
*H02J 9/06* (2006.01)
*H02J 13/00* (2006.01)
*H04L 12/10* (2006.01)
*H02J 7/35* (2006.01)

(52) U.S. Cl.
CPC .................. *H02J 7/34* (2013.01); *H02J 7/35* (2013.01); *H02J 9/061* (2013.01); *H02J 13/0003* (2013.01); *H04L 12/10* (2013.01); *Y02B 10/72* (2013.01); *Y02B 90/222* (2013.01); *Y02E 40/72* (2013.01); *Y04S 10/123* (2013.01); *Y04S 20/12* (2013.01)

(58) Field of Classification Search
CPC ... G06F 1/263; H02J 1/10; H02J 1/108; H02J 7/34; H02J 9/061; H02J 13/003; H02J 7/35; H04L 12/10
See application file for complete search history.

(56) References Cited

U.S. PATENT DOCUMENTS

| | | |
|---|---|---|
| 2010/0181957 A1 | 7/2010 | Goeltner |
| 2011/0080044 A1 | 4/2011 | Schmiegel |
| 2011/0082598 A1 | 4/2011 | Boretto et al. |
| 2011/0089760 A1 | 4/2011 | Castelaz et al. |
| 2011/0140648 A1 | 6/2011 | Lee |
| 2011/0302078 A1 | 12/2011 | Failing |
| 2012/0074901 A1 | 3/2012 | Mohammed |
| 2012/0091965 A1 | 4/2012 | Seo et al. |
| 2012/0119586 A1 | 5/2012 | Carralero et al. |
| 2012/0153722 A1 | 6/2012 | Nazarian |
| 2012/0173035 A1 | 7/2012 | Abe |
| 2012/0206104 A1 | 8/2012 | Tsuchiya |
| 2012/0267952 A1 | 10/2012 | Ballantine et al. |
| 2012/0323396 A1 | 12/2012 | Shelton et al. |
| 2012/0326668 A1 | 12/2012 | Ballatine et al. |
| 2013/0088084 A1* | 4/2013 | Szu .......................... H02J 1/10 307/66 |
| 2013/0138256 A1 | 5/2013 | Sako et al. |
| 2013/0197710 A1 | 8/2013 | Hansen |
| 2014/0067151 A1 | 3/2014 | Erhart et al. |
| 2014/0077596 A1 | 3/2014 | Nishibayashi et al. |
| 2016/0248261 A1 | 8/2016 | Tokuda et al. |
| 2016/0329744 A1 | 11/2016 | Werth et al. |
| 2017/0163051 A1 | 6/2017 | Morita et al. |

FOREIGN PATENT DOCUMENTS

| | | |
|---|---|---|
| JP | 2004-310569 A | 11/2004 |
| JP | 2006-288162 A | 10/2006 |
| JP | 2011-061970 A | 3/2011 |
| JP | 2011-205871 A | 10/2011 |
| JP | 2012-060760 A | 3/2012 |
| JP | 2013-090560 A | 5/2013 |
| JP | 2013-143825 A | 7/2013 |
| JP | 2013-247792 A | 12/2013 |
| JP | 2014-060855 A | 4/2014 |
| JP | 2017-077172 A | 4/2017 |
| WO | WO 2004/036399 A2 | 4/2004 |
| WO | WO 2014/020644 A1 | 2/2014 |

OTHER PUBLICATIONS

European Office Action dated Feb. 14, 2018 in connection with European Application No. 15741609.0.

No Author Listed, Sony Computer Science Laboratories, Inc., (Sony CSL), Open Energy Systems, Research Gallery, retrieved on May 16, 2018 noting date of Mar. 27, 2015, https://web.archive.org/web/20150327075359/http://www.sonycsl.co.jp/en/research_gallery/open-energy-system.html, 3 pages.

European Office Action dated Sep. 11, 2018 in connection with European Application No. 15751111.4.

* cited by examiner

[Fig. 1]
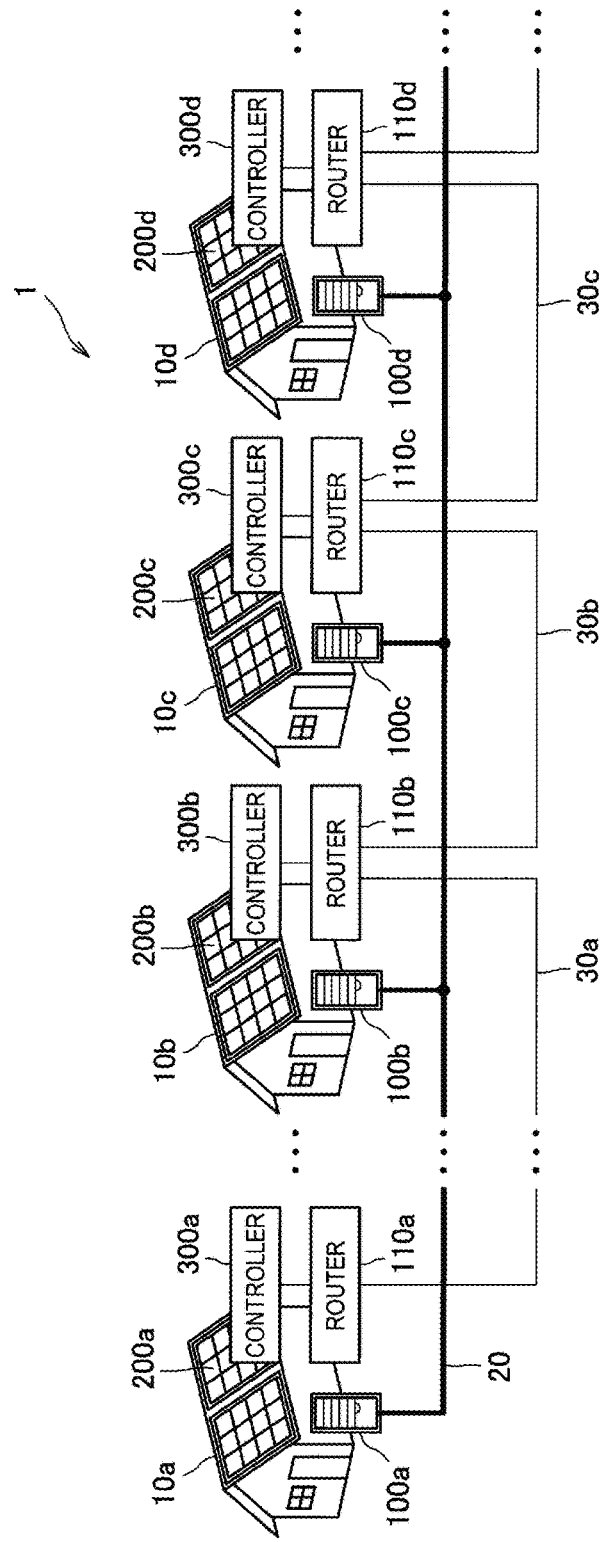

[Fig. 2]
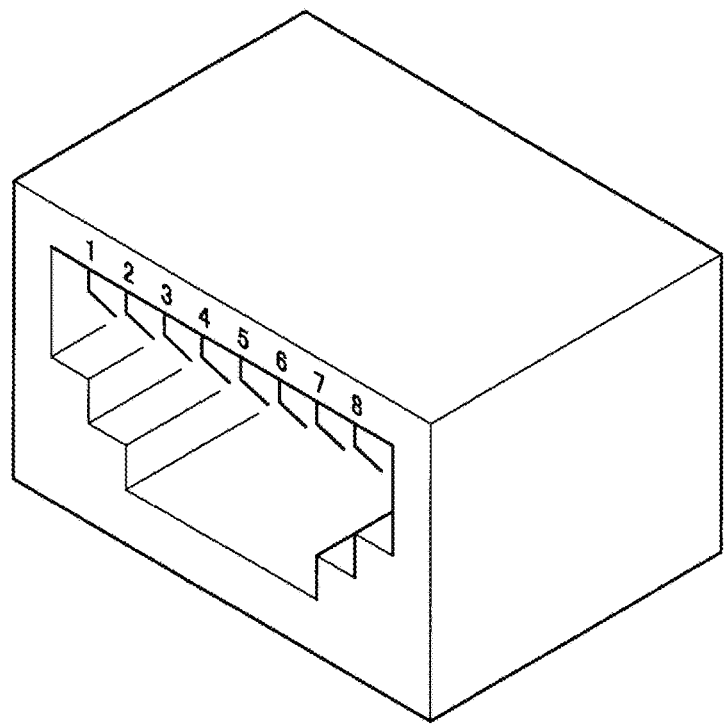
[Fig. 3]
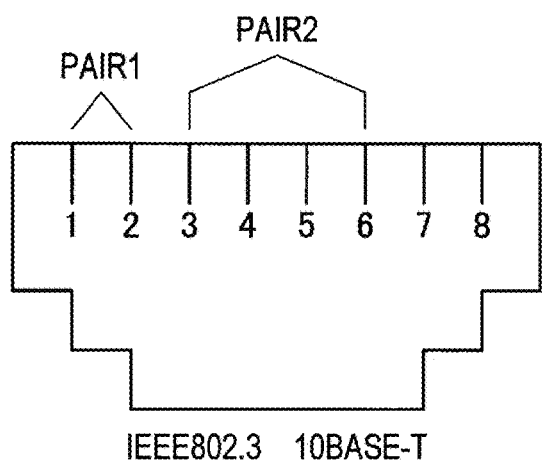

[Fig. 4]
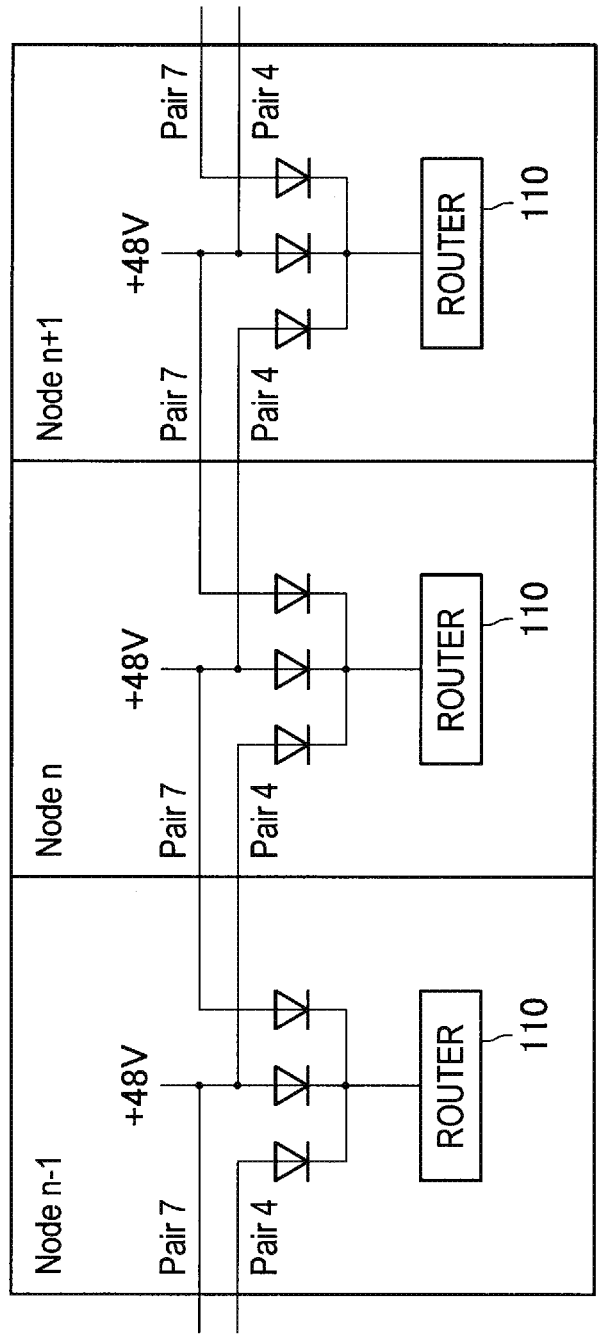

[Fig. 5]
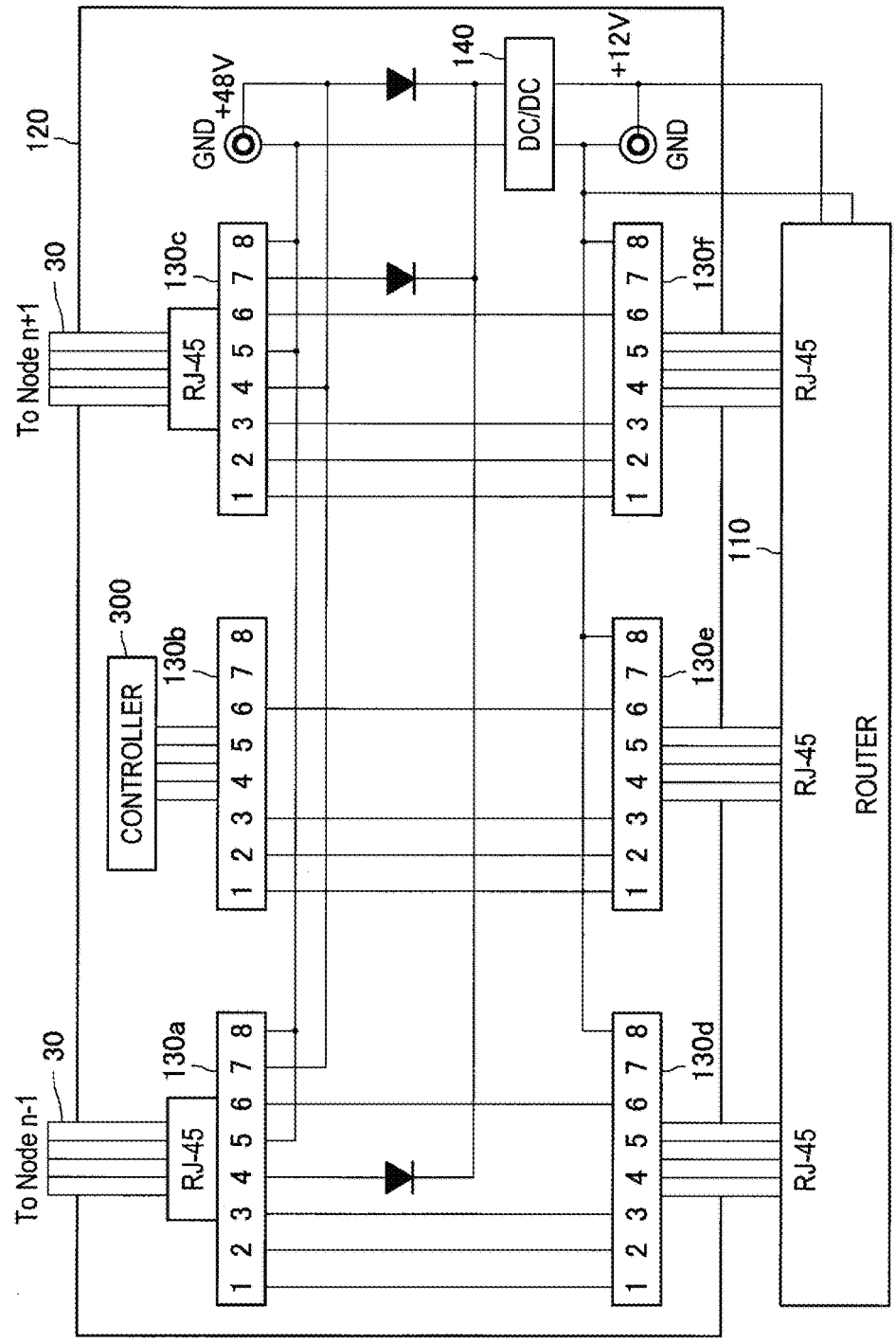

[Fig. 6]
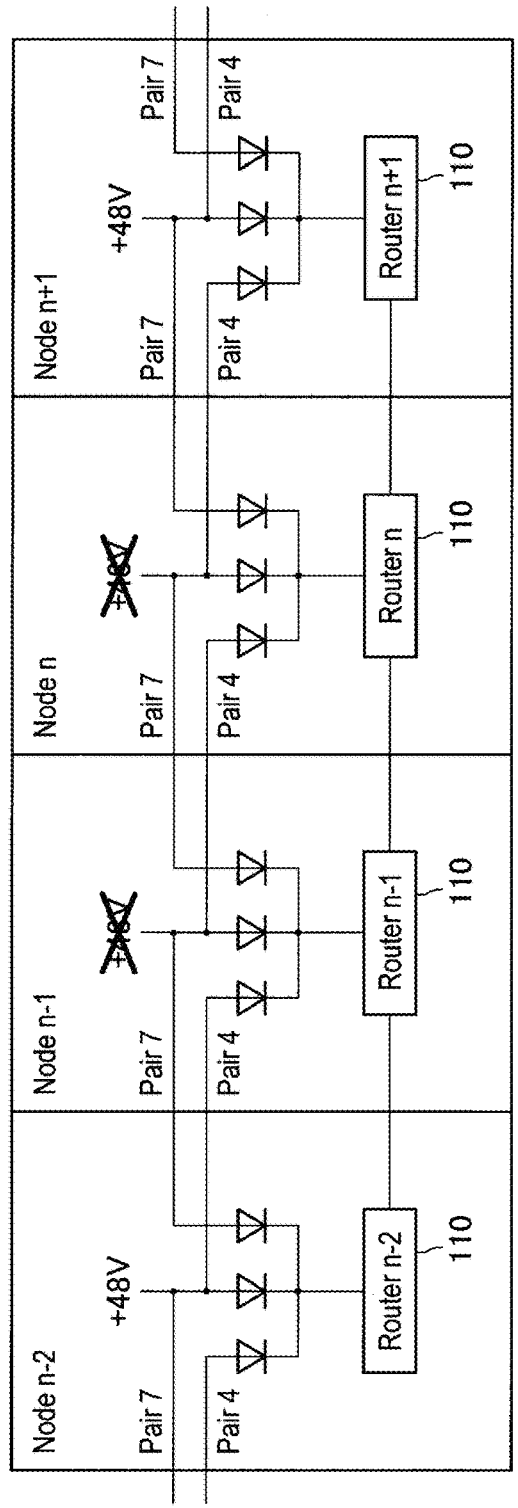

[Fig. 7]
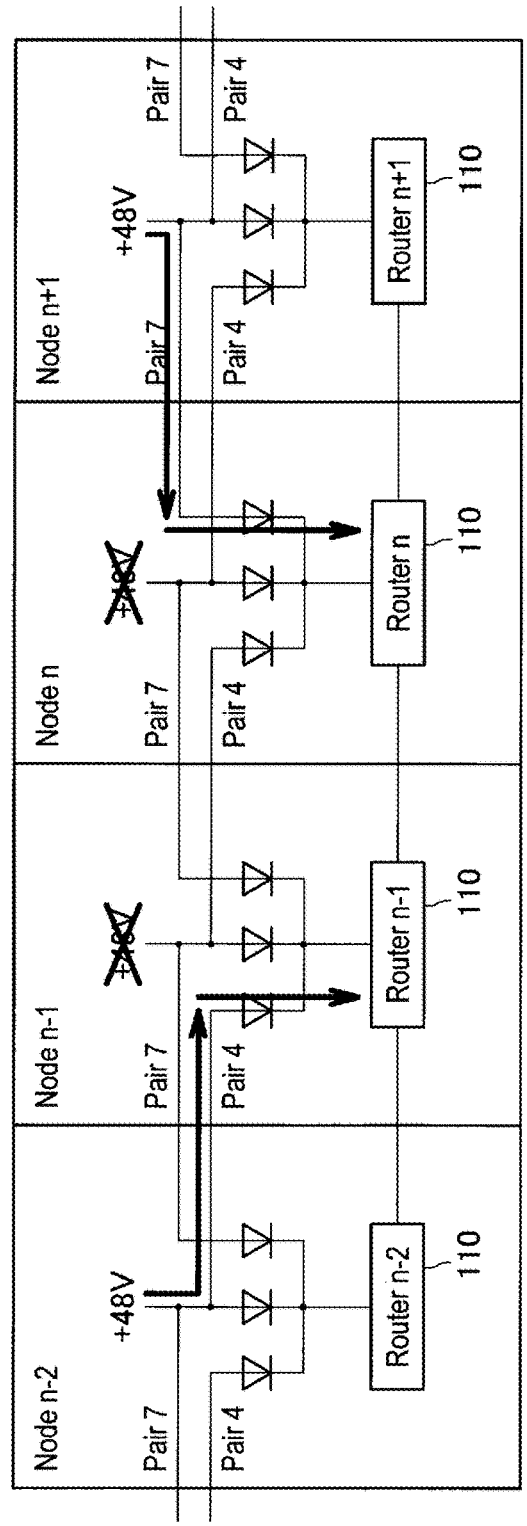

[Fig. 8]
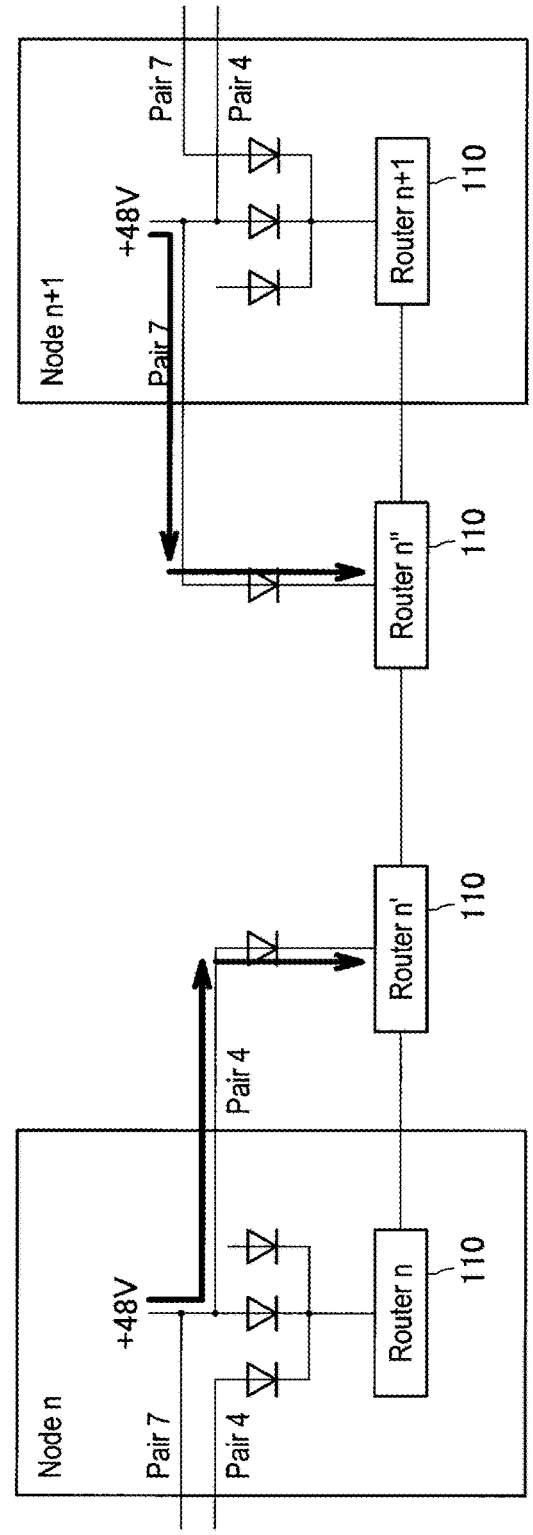

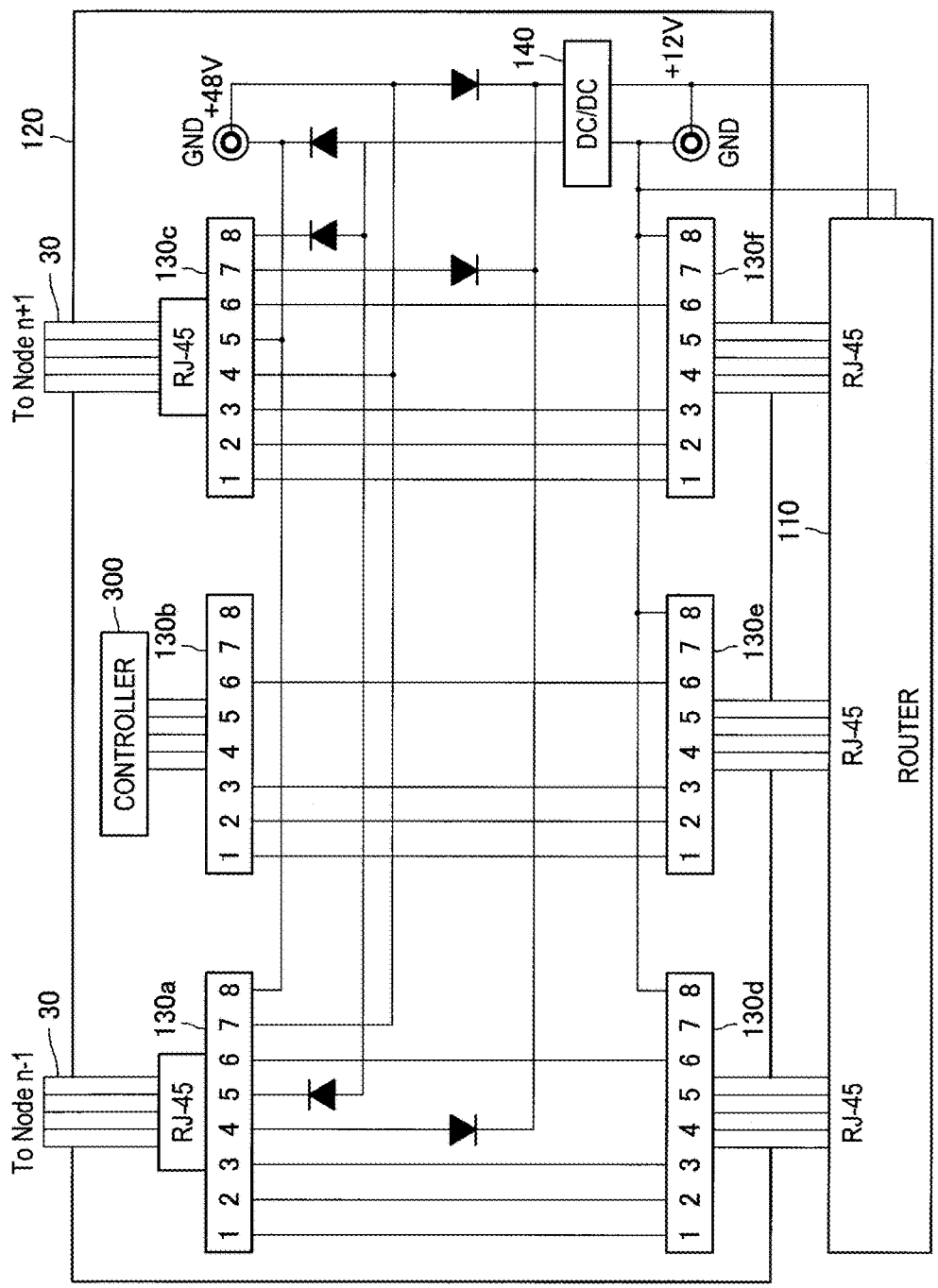
[Fig. 9]

[Fig. 10]
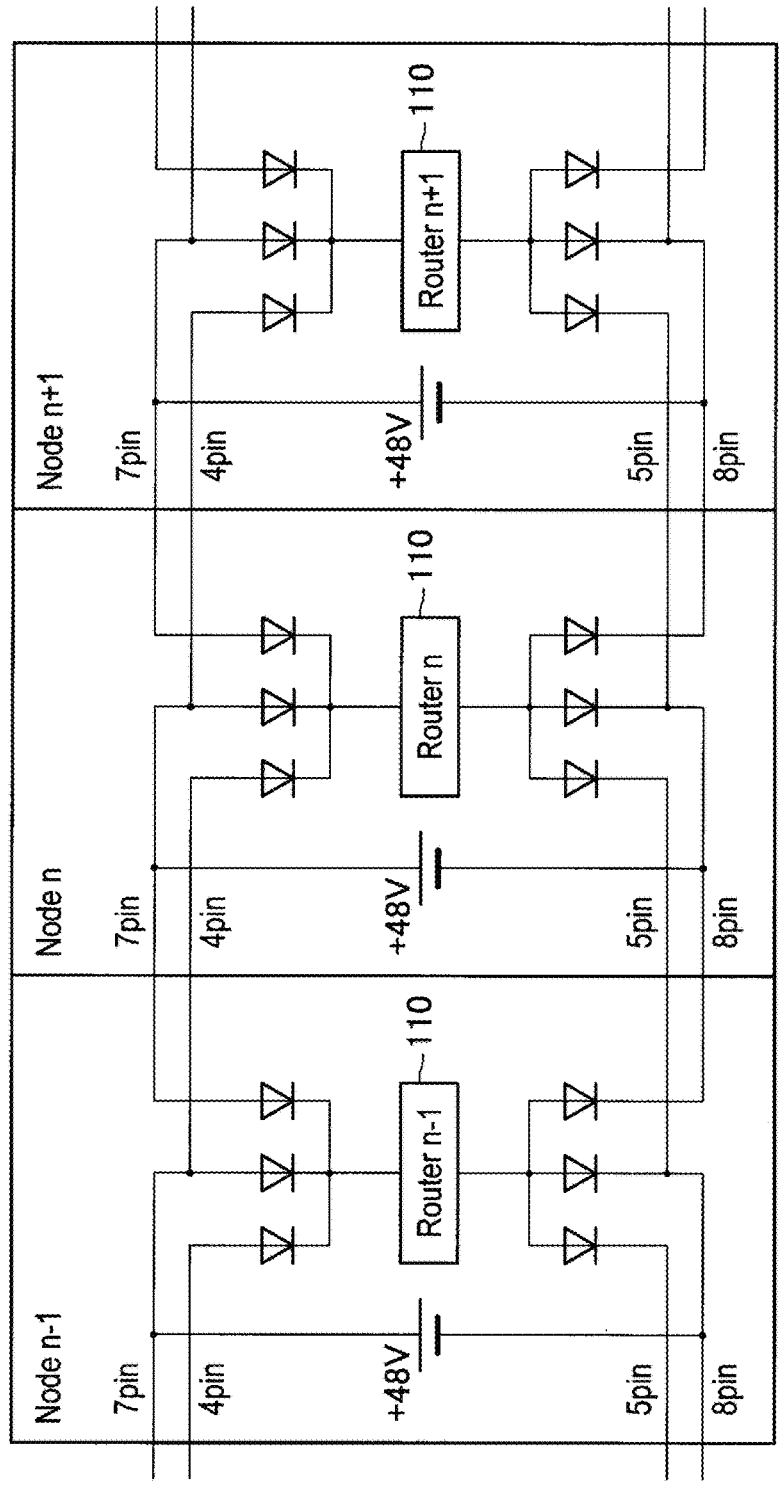

[Fig. 11]
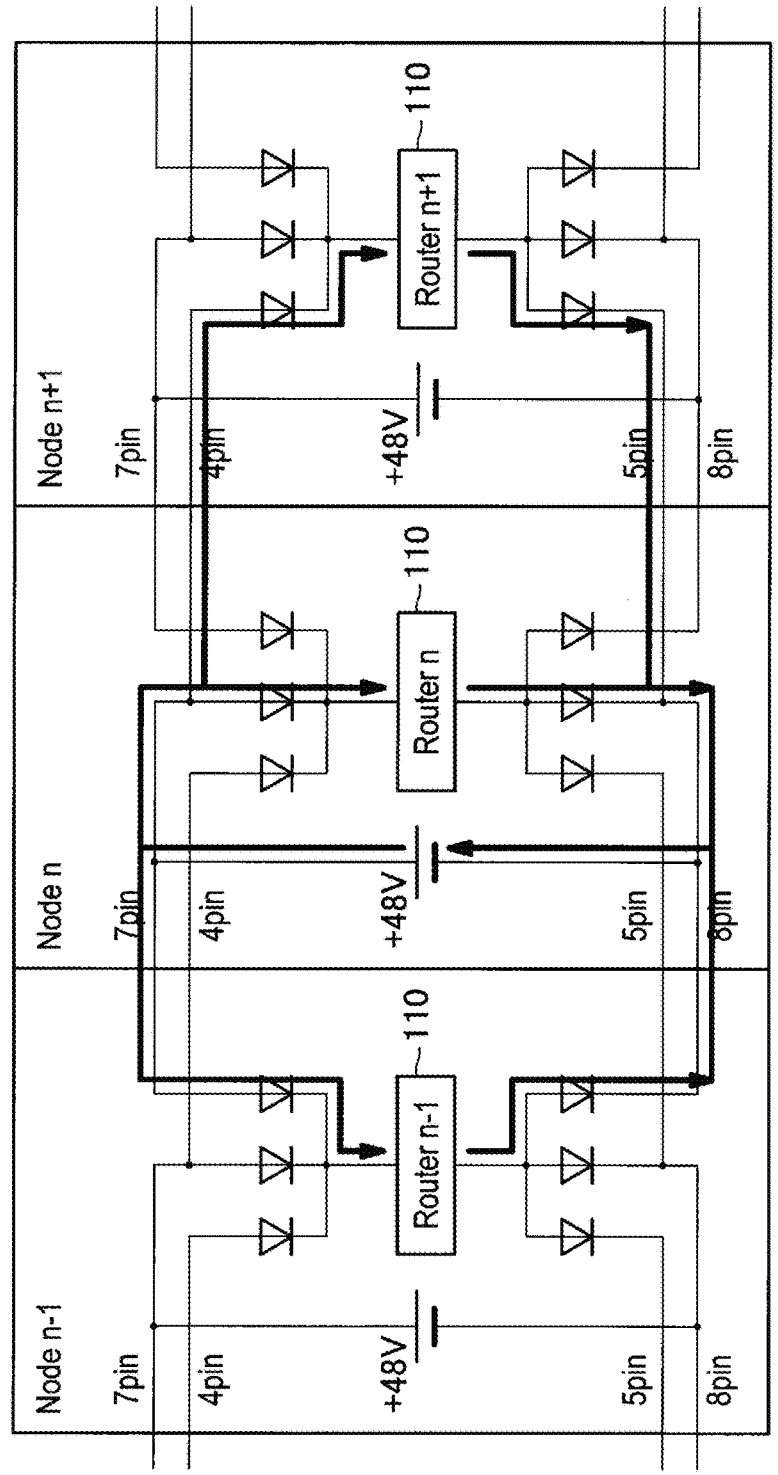

[Fig. 12]
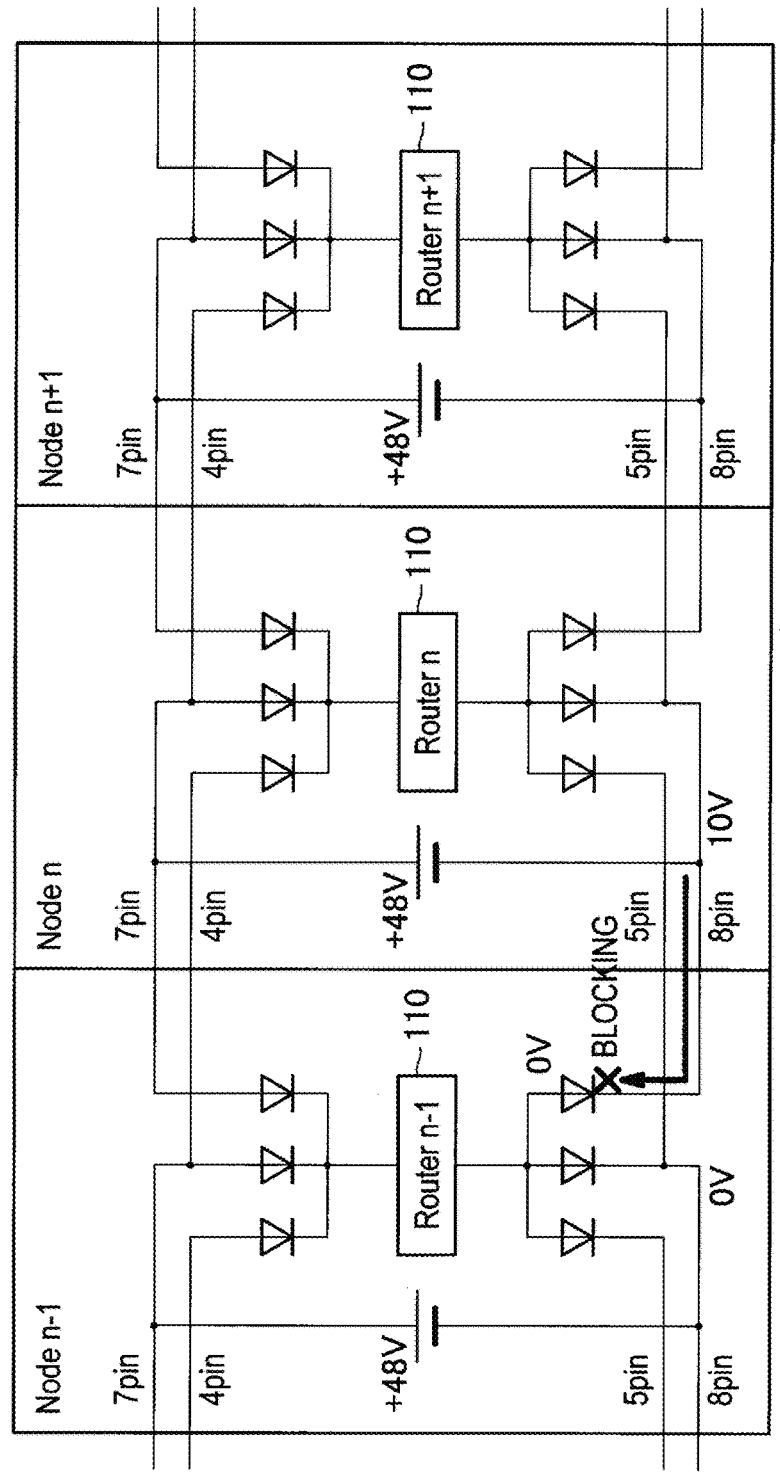

POWER SUPPLY DEVICE, METHOD OF SUPPLYING POWER, AND POWER SUPPLY SYSTEM

CROSS REFERENCE TO RELATED APPLICATIONS

This application claims the benefit of Japanese Priority Patent Application JP 2014-162362 filed Aug. 8, 2014, the entire contents of which are incorporated herein by reference.

TECHNICAL FIELD

The present disclosure relates to a power supply device, a method of supplying power, and a power supply system.

BACKGROUND ART

There is known an uninterruptible power supply provided with a storage battery for continuing to provide power from the storage battery to equipment connected thereto for a predetermined time without causing power failure even when the power from an input power source is interrupted. Techniques are developed for extending such a power supply into each consumer and supplying power to the consumers when an abnormality occurs in supplying power due to power failure, shortage of storage battery capacity, or other reasons (see PTLs 1 and 2).

CITATION LIST

Patent Literature

PTL 1: JP 2011-205871A
PTL 2: JP 2013-090560A

SUMMARY

Technical Problem

When consumers supply power to each other, it is desirable for the sake of efficiency to use direct-current power in consideration of supply of power from a storage battery. When consumers supply direct-current power to each other, a network is formed among consumers and the supply of power is controlled using constant communication. A network router is necessary to be supplied with power in a stable manner.

Therefore, according to an embodiment of the present disclosures, there is provided a novel and improved power supply device, method of supplying power, and power supply system, capable of supplying power to a network router performing constant communication in a stable manner when consumers supply direct-current power to each other by forming a network among consumers.

Solution to Problem

In one embodiment, there is provided a power interchange system for distributing direct current (DC) electrical power. The power interchange system comprises a plurality of nodes comprising a first node and a second node. The first node comprises a first communication device and a first power source to power the first communication device. The second node comprises a second communication device and a second power source to power the second communication device. The power interchange system further comprises a wired cable connecting the first node and the second node. The wired cable comprises at least one first wire to convey DC power from the first power source of the first node to the second node to power the second communication device or from the second power source of the second node to the first node to power the first communication device.

In another embodiment, there is provided a method of operating a first node of a power interchange system comprising a plurality of nodes. Each node of the plurality of nodes comprises a communication device and a storage battery. The method comprises supplying power from a first storage battery of the first node to a first communication device of the first node and, in a case that power from the first storage battery is unavailable to power the first communication device, receiving power at the first node from a second storage battery of a second node and powering the first communication device using power from the second storage battery.

In a further embodiment, there is provided an apparatus to transmit and/or receive power in a power interchange system. The apparatus comprises a communication device, a power source connected to the communication device to power the communication device, a power terminal to transmit DC power to the power interchange system from the power source and/or to receive DC power from the power interchange system, the power terminal being connected to the power source, and a network terminal to transmit and/or receive control signals relating to transmission and/or receipt of power via the power interchange system and to receive DC power via the power interchange system. The network terminal is connected to at least one network port of the communication device and to a power supply of the communication device.

Advantageous Effects of Invention

According to one or more of embodiments of the present disclosure described above, it is possible to provide a novel and improved power supply device, method of supplying power, and power supply system, capable of supplying power to a network router in a stable manner when consumers supply direct-current power to each other by forming a network among consumers.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram illustrated to describe an overall configuration example of a power transmission and reception control system according to an embodiment of the present disclosure.

FIG. 2 is a diagram illustrated to describe pin arrangement of a network connector in the 10Base-T.

FIG. 3 is a diagram illustrated to describe pin arrangement of a network connector in the 10Base-T.

FIG. 4 is a diagram illustrated to describe an overview of how to supply direct-current power to a network router.

FIG. 5 is a diagram illustrated to describe an exemplary configuration of a power supply device 120 according to an embodiment of the present disclosure.

FIG. 6 is a diagram illustrated to describe an exemplary operation of a power transmission and reception control system using a power supply device 120 according to an embodiment of the present disclosure.

FIG. 7 is a diagram illustrated to describe an exemplary operation of a power transmission and reception control system using a power supply device 120 according to an embodiment of the present disclosure.

FIG. 8 is a diagram illustrated to describe an exemplary operation of a power transmission and reception control system using a power supply device 120 according to an embodiment of the present disclosure.

FIG. 9 is a diagram illustrated to describe an exemplary configuration of the power supply device 120 according to an embodiment of the present disclosure.

FIG. 10 is a diagram illustrated to describe an exemplary operation of a power transmission and reception control system using a power supply device 120 according to an embodiment of the present disclosure.

FIG. 11 is a diagram illustrated to describe an exemplary operation of a power transmission and reception control system using a power supply device 120 according to an embodiment of the present disclosure.

FIG. 12 is a diagram illustrated to describe an exemplary operation of a power transmission and reception control system using a power supply device 120 according to an embodiment of the present disclosure.

DESCRIPTION OF EMBODIMENTS

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Embodiment of Present Disclosure
1.1. Background
1.2. Exemplary Configuration of System
1.3. Exemplary Configuration of Device
1.4. Exemplary Operation
2. Conclusion 1. Embodiment of Present Disclosure 1.1. Overview A background of a technology according to an embodiment of the present disclosure will be described prior to the description of an embodiment of the present disclosure.

The description is based on the assumption that an environment becomes increasingly popular in which each consumer is provided with a battery server having a storage battery, the storage battery stores power using a commercial power supply or power generated from a natural energy source such as solar, wind, and geothermal, and the power stored in the storage battery drives electrical appliances. With the spread of such environment, a power interchange system is designed for interchanging power between consumers, as described above. When power is insufficient in a battery server of a consumer, the power interchange system allows a battery server of a consumer having extra power to supply power to the battery server of the consumer having insufficient power. When consumers supply power to each other, it is preferable, for the sake of efficiency, to supply direct-current power in consideration of the supply of power from a storage battery.

When consumers supply direct-current power to each other, it is desirable to form a network among consumers and to control the supply of power using constant communication. A network router is necessary to be supplied with power in a stable manner. When consumers supply direct-current power to each other, it is considered that the power may not be supplied with power from the existing commercial alternating-current power source. Thus, a network router is preferably configured to operate with direct-current power received from a battery server, not from a commercial power source.

When consumers supply the direct-current power to each other, the consumers may be located far away from each other. Thus, the network router preferably communicates in a wired manner. When consumers supply the direct-current power to each other, it is preferable to configure a network in which consumers are connected in a daisy chain on the assumption that consumers are located far away from each other.

For example, 10Base-T is one of the communication standards. The 10Base-T has a transmission rate lower than 100Base-T or 1000Base-T by up to 10 Mbps, but it may be constructed at low cost. The 10Base-T has a maximum transmission length of 100 meters over one cable segment. Thus, as long as the distance between consumers is within 100 meters, it is possible to communicate between consumers without interposing a network router between consumers when consumers supply the direct-current power to each other.

However, when consumers supply the direct-current power to each other, consumers may be connected to each other in a daisy chain configuration and a network may be configured in such a way that a network router operates with direct-current power received from a battery server, not from a commercial power source. In this case, it is necessary to take measures against the following events.

If even one battery server is stopped due to factors such as failure, the supply of power to a network router will be interrupted. The interruption of the supply of power to a network router stops the network router.

In the case where consumer are connected to each other in a daisy chain configuration, if one network router is stopped, the entire network is stopped because without a bypass path. In other words, if even one battery server is stopped due to factors such as failure, the entire network is stopped, thereby failing to control the entire system.

As described above, the 10Base-T has a maximum transmission length of 100 meters over one cable segment. However, to connect between consumers located more than 100 meters away from each other, it is necessary to construct an expensive communication system using an optical fiber cable.

When consumers (nodes) have different ground levels from each other, an excessive current may flow into a node from an adjacent one, resulting in probably burnout of a cable.

The present inventors have made extensive studies to achieve a technology capable of significantly reducing the occurrence of power interruption to a network router and allowing a network having a daisy chain configuration to be constructed at low cost while avoiding the problematic events described above. As a result, the present inventors have developed the technology capable of significantly reducing the occurrence of power interruption to a network router and allowing a network having a daisy chain configuration to be constructed at low cost as well, which will be described below.

The technical background of an embodiment of the present disclosure has been described above. Next, an embodiment of the present disclosure will be described in detail. An exemplary configuration of a system according to an embodiment of the present disclosure will be described.

1.2. Exemplary System Configuration

FIG. 1 is a diagram illustrated to describe an overall configuration example of the power transmission and reception control system according to an embodiment of the present disclosure. FIG. 1 illustrates an overall configuration example of the power transmission and reception control system that interchanges direct-current power between battery servers having their own storage batteries. An overall configuration example of the power transmission and reception control system according to an embodiment of the present disclosure will be described with reference to FIG. 1.

As shown in FIG. 1, the power transmission and reception control system 1 is constructed to mutually supply direct-current power as necessary among battery servers provided in the respective consumers (four in FIG. 1). A consumer 10a is provided with a battery server 100a. Similarly, a consumer 10b, a consumer 10c, and a consumer 10d are provided with a battery server 100b, a battery server 100c, and a battery server 100d, respectively. Each of the battery servers 100a to 100d has a rechargeable battery provided inside or outside of each battery server.

The battery servers 100a to 100d are connected to a direct-current bus line 20 over which direct-current power is mutually supplied among the battery servers as necessary. Each of the battery servers 100a to 100d is provided with a bidirectional DC-to-DC converter that converts voltage of a battery and voltage of the direct-current bus line 20 from one level to another.

The consumers 10a to 10d may be provided with solar panels 200a to 200d, respectively. Each of the solar panels 200a to 200d receives irradiation of sunlight and generates electric power. The solar panels 200a to 200d are configured so that the generated electric power may be stored in the respective batteries provided in the battery servers 100a to 100d. In the present embodiment, the consumers 10a to 10d are provided with the solar panels 200a to 200d, respectively. However, the battery servers 100a to 100d may be configured to store power generated by natural energy, such as wind, geothermal, and biomass, other than sunlight.

The consumers 10a to 10d are provided with controllers 300a to 300d, respectively. The controllers 300a to 300d are used to control the transmission and reception of direct-current power to and from the battery servers 100a to 100d via the direct-current bus line 20. How to control the transmission and reception of direct-current power to and from the battery servers 100a to 100d via the direct-current bus line 20 by the controllers 300a to 300d is not limited to a particular method, and an example thereof is as follows.

The power transmission and reception control system 1 according to the present embodiment may include a mechanism for arbitrating power transmission and reception among the battery servers 100a to 100d in such a way that only one of the battery servers 100a to 100d connected to the direct-current bus line 20 has the right to control the transmission and reception of direct-current power over the direct-current bus line 20.

In other words, the power transmission and reception control system 1 according to the present embodiment may have a mechanism that allows only the batter server having the control right among the battery servers 100a to 100d to instruct other battery servers to transmit power stored in their own batteries or to receive power for charging their own batteries, and that prevents a battery server having no control right from performing the power transmission and reception without permission or instruction.

To allow the controllers 300a to 300d to control the transmission and reception of direct-current power to and from the battery servers 100a to 100d via the direct-current bus line 20, the consumers 10a to 10d are respectively provided with network routers 110a to 110d. If each of the consumers 10a to 10d is referred to as a node, then the network routers 110a to 110d may serve as a relay device used to connect nodes to each other in a daisy chain configuration. Thus, the network router 110b is connected to the network router 110a via a network cable 30a, and the network router 110b is connected to the network router 110c via a network cable 30b. The network router 110c is connected to the network router 110b via the network cable 30b, and the network router 110c is connected to the network router 110d via a network cable 30c.

The network routers 110a to 110d transmits and receives information on transfer of direct-current power by the battery servers 100a to 100d to and from the consumers 10a to 10d. Examples of the information on transfer of direct-current power by the battery servers 100a to 100d may include amount of power supply, particulars of power (electric current and voltage), and duration of power supply (start time and end time). The information on transfer of direct-current power by the battery servers 100a to 100d is not limited to a particular format. The format of information is defined in the power transmission and reception control system 1. The network routers 110a to 110d respectively operate with direct-current power received from the battery servers 100a to 100d, not from a commercial alternating-current power source.

In the present embodiment, as a network standard, a standard, such as 10Base-T, that can be constructed at low costs is used, although it has a lower transmission rate. As the network cables 30a to 30c, an Ethernet (registered trademark) cable is used.

In the 10Base-T, the pin arrangement of a network connector having the network cables 30a to 30c inserted into the network connector will be described. FIGS. 2 and 3 are diagrams illustrated to describe the pin arrangement of the network connector in the 10Base-T. As shown in FIGS. 2 and 3, the network connector in the 10Base-T is a connector referred to so-called 8P8C in which there are eight connection positions and all of them are connected. An example of the 8P8C connector includes RJ-45. As shown in FIGS. 2 and 3, in the 10Base-T, pins #1, #2, #3, and #6 are predetermined to be used for communication. In the 10Base-T, pins #4, #5, #7, and #8 are not used for communication.

In the present embodiment, it is characterized in that the power is able to be supplied to the network routers 110 to 110d via the network cables 30a to 30c using pins #4, #5, #7, and #8 which are not used for communication in the 10Base-T.

The power is able to be supplied to the network routers 110 to 110d via the network cables 30a to 30c using pins that are not used for communication in the 10Base-T. Thus, for example, when the supply of power from the battery server 100c to the network router 110c is interrupted due to a factor such as failure of the battery server 100c, it is possible to continue to receive power from the battery server 100b or 100d of an adjacent node via the network cable 30b or 30c.

The supply of power to the network router 110c from the battery server 100b or 100d of the adjacent nodes via the network cable 30b or 30c can be continued, and thus it is possible to prevent the network router 110c from being interrupted.

In the present embodiment, the power is able to be supplied to the network routers 110a to 110d via the network cables 30b and 30c using pins that are not used for communication in the 10Base-T. Thus, when the distance between nodes exceeds a maximum communicable distance defined in the 10Base-T, it is possible to connect nodes, which are spaced apart from each other by a distance exceeding the maximum communicable distance, by connecting network routers in a daisy chain.

FIG. 4 is a diagram illustrated to describe an overview of how to supply direct-current power to a network router. FIG. 4 illustrates three nodes (node n−1, node n, and node n+1) for the sake of description. Each of the nodes is provided with the network router 110.

The node n is connected with the adjacent nodes n+1 and n−1 via the network cable 30. The node n is supplied with power through a pin #4 from the node n+1 and a pin #7 from the node n−1. The node n receives power from the nodes n+1 and n−1 via a diode. The node n is supplied with power generated from a DC-to-DC converter in its own node via a diode. The node n supplies the direct-current power, which is received from its own node and the nodes n+1 and n−1 as described above, to the network router 110.

The node n connects a signal line from the node n+1 and the node n−1 to the network router 110. The network router 110 of the node n is connected to a controller 300 (not shown in FIG. 4) of its own node.

In the present embodiment, the power supply voltage used to operate the network router 110 is set to 48 V. The power supply voltage used to operate the network router is generally set to be a low voltage, for example, 12 V, but when nodes are connected using a thin wire such as network cable and power is supplied over an Ethernet connection, voltage drop occurs.

In the present embodiment, the power supply voltage that is set to 48 V is converted into 12 V by a DC-to-DC converter in its own node, and then is supplied to the network router 110 to drive the network router 110. The voltage of 48 V is an output voltage of a typical household storage battery, and the output of the battery server 100 can be used without any conversion. Thus, it is not necessary to provide an additional circuitry to operate the network router 110.

An overall configuration example of the power transmission and reception control system according to an embodiment of the present disclosure has been described. Next, an example of a device used to supply power to the network router 110 will be described in detail.

1.3. Exemplary Configuration of Device

FIG. 5 is a diagram illustrated to describe an exemplary configuration of a power supply device 120 according to an embodiment of the present disclosure. The power supply device 120 illustrated in FIG. 5 is an example of a device used to supply power to the network router 110 of the node n. An exemplary configuration of the power supply device 120 according to an embodiment of the present disclosure will be described with reference to FIG. 5.

As shown in FIG. 5, the power supply device 120 according to an embodiment of the present disclosure is configured to include connectors 130a to 130f and a DC-to-DC converter 140. Although the power supply device 120 according to an embodiment of the present disclosure is configured to include the controller 300 therein as shown in FIG. 5, the controller 300 may not be included in the power supply device 120.

The connector 130a is a connector used to connect with the network cable 30. In the present embodiment, the connector 130a is a connector used to connect with the adjacent node n−1 via the network cable 30. The connector 130a is configured to exchange data with the adjacent node n−1 using pins #1, #2, #3, and #6 defined in the 10Base-T. The connector 130a is configured to transmit and receive direct-current power to and from the adjacent node n−1 using pins #4, #5, #7, and #8.

The connector 130a is configured to receive the direct-current power of 48 V from the adjacent node n−1 through the pin #4, and to transmit the direct-current power of 48 V to the adjacent node n−1 through the pin #7. The connector 130a is configured to be supplied with the ground (GND) potential through the pins #5 and #8. The pin #4 is connected to a diode used to prevent the direct-current power of 48 V of its own node from being transmitted to the node n−1 through the pin #4.

The connector 130c is a connector used to connect with the network cable 30. In the present embodiment, the connector 130c is a connector used to connect with the adjacent node n+1 via the network cable 30. The connector 130c is configured to exchange data with the adjacent node n+1 using pins #1, #2, #3, and #6 defined in the 10Base-T, which is similar to the connector 130a. The connector 130c is configured to transmit and receive direct-current power to and from the adjacent node n+1 using pins #4, #5, #7, and #8.

The connector 130c is configured to receive the direct-current power of 48 V from the adjacent node n+1 through the pin #7, and to transmit the direct-current power of 48 V to the adjacent node n+1 through the pin #4. The connector 130c is configured to be supplied with the ground (GND) potential through the pins #5 and #8. The pin #7 is connected to a diode used to prevent the direct-current power of 48 V of its own node from being transmitted to the node n+1 through the pin #7.

In other words, the power supply device 120 according to an embodiment of the present disclosure supplies the direct-current power to the node n−1 through a set of pins #7 and #8 (Pair 7), and supplies the direct-current power to the node n+1 through a set of pins #4 and #5 (Pair 4). This arrangement of the power supply device 120 according to an embodiment of the present disclosure is similarly applied to other nodes.

In the present embodiment, although the power supply device 120 is configured to supply the direct-current power to the node n−1 through a set of pins #7 and #8 (Pair 7) and supply the direct-current power to the node n+1 through a set of pins #4 and #5 (Pair 4), the present disclosure is not necessarily limited to such example.

The connector 130b is a connector used to connect with the controller 300. The connector 130b does not perform transmission and reception of power but performs only the exchange of data, which is different from the connectors 130a and 130c. Thus, the connector 130b is configured to only be able to exchange data with the adjacent node n−1 using pins #1, #2, #3, and #6 defined in the 10Base-T.

The DC-to-DC converter 140 converts the direct-current power received from its own node and the nodes n+1 and n−1 into the direct-current power to be supplied to the network router 110. In the present embodiment, the direct-current power of 48 V received from its own node and the nodes n+1 and n−1 is converted into the direct-current power of 12 V to be supplied to the network router 110. The DC-to-DC converter 140 supplies the direct-current power of 12 V to the network router 110 and outputs the ground potential to the pin #8 of each of the connectors 130*d*, 130*e*, and 130*f*.

The connectors 130*d*, 130*e*, and 130*f* are connectors used to connect with the network router 110. The connector 130*d* is configured to provide the data received from the adjacent node n−1 to the network router 110 through the pins #1, #2, #3, and #6 of the connector 130*a*. The connector 130*d* is also configured to transmit the data outputted from the network router 110 to the adjacent node n−1 through the pins #1, #2, #3, and #6 of the connector 130*a*.

The connector 130*e* is configured to provide the data received from the controller 300 to the network router 110 through the pins #1, #2, #3, and #6 of the connector 130*b*. The connector 130*e* is also configured to transmit the data outputted from the network router 110 to the controller 300 through the pins #1, #2, #3, and #6 of the connector 130*b*.

The connector 130*f* is configured to provide the data received from the adjacent node n+1 to the network router 110 through the pins #1, #2, #3, and #6 of the connector 130*c*. The connector 130*e* is also configured to transmit the data outputted from the network router 110 to the adjacent node n+1 through the pins #1, #2, #3, and #6 of the connector 130*b*.

The power supply device 120 according to an embodiment of the present disclosure has the configuration shown in FIG. 5. Thus, the power supply device 120 is able to receive the direct-current power form the adjacent nodes n−1 and n+1 via the network cable 30, convert the direct-current power into a voltage suitable for the operation of the network router 110, and supply the direct-current power to the network router 110.

Even when the supply of power from its own node is interrupted, the power supply device 120 according to an embodiment of the present disclosure having the configuration shown in FIG. 5 allows the direct-current power to be received form the adjacent nodes n−1 and n+1 via the network cable 30, thereby supplying the power to the network router 110 without interruption.

An exemplary configuration of the power supply device 120 according to an embodiment of the present disclosure has been described with reference to FIG. 5. Next, an exemplary operation of the power transmission and reception control system using the power supply device 120 according to an embodiment of the present disclosure will be described.

1.4. Exemplary Operation

FIG. 6 is a diagram illustrated to describe an exemplary operation of the power transmission and reception control system using the power supply device 120 according to an embodiment of the present disclosure. FIG. 6 illustrates four nodes n−2, n−1, n, and n+1. Each node shown in FIG. 6 supplies the direct-current power to the network router 110 of its own node and supplies the direct-current power to adjacent nodes through Pair 4 and Pair 7 as described above.

Here is illustrated a case where the power fails to be supplied to the network router 110 of its own node due to the failure of a battery server or the depletion of a battery server in the node n−1 and node n. In a case where the power fails to be supplied to the network router 110 of its own node in the node n−1 and node n, the node n−1 and node n receive the direct-current power from the node n−2 and node n+1, respectively, and they supply the power to the network router 110 of their own nodes, as shown in FIG. 7.

In this way, in a case where the power fails to be supplied to the network router 110 of its own node, the direct-current power is received from an adjacent node, and thus it can be seen that it is possible to supply the power to the network router 110 without interruption.

There is illustrated another exemplary operation. As described above, the 10Base-T has a maximum transmission length of 100 meters over one cable segment. Thus, by providing the power supply device 120 according to an embodiment of the present disclosure to relay between consumers, it is possible to perform data communication between consumers through the 10Base-T, even when the distance between consumers exceeds 100 meters.

FIG. 8 is a diagram illustrated to describe an exemplary operation of the power transmission and reception control system using the power supply device 120 according to an embodiment of the present disclosure. FIG. 8 illustrates two nodes n and n+1. The distance between the node n and the node n+1 shown in FIG. 8 is assumed to be 300 meters. Each of the nodes shown in FIG. 8 is configured to supply the direct-current power to the network router 110 of its own node and supply the direct-current power to an adjacent network router 110.

When the distance between the node n and the node n+1 is 300 meters, the connection and data transmission between nodes using one network cable through the 10Base-T may not be possible. While, by providing two network routers 110 interposed between nodes for relaying, it is possible to transmit data between the node n and the node n+1 through the 10Base-T.

The two network routers 110 interposed between nodes receive the direct-current power from the node n and the node n+1, and thus the necessity of providing a battery server therebetween is eliminated, and the data communication between consumers through the 10Base-T is possible even when the distance between consumers exceeds 100 meters.

The power supply device 120 of each node may have a configuration for preventing backflow of an electric current from the power supply device 120 of another node. FIG. 9 is a diagram illustrated to describe an exemplary configuration of the power supply device 120. The power supply device 120 shown in FIG. 9 is different from the power supply device 120 according to an embodiment of the present disclosure shown in FIG. 5 in that the pin #5 of the connector 130*a* and the pin #8 of the connector 130*c* are provided with a diode. This diode is used to separate the ground level between their respective adjacent nodes and to prevent backflow of an electric current from the adjacent nodes.

The power supply device 120 shown in FIG. 9 is provided with a diode use to separate the ground level between adjacent nodes and to prevent an electric current from the adjacent nodes from flowing backward from the ground (GND) to the network router 110. Thus, the diode included as an additional component in the configuration shown in FIG. 9 may function as an example of a separation unit according to an embodiment of the present disclosure. As the separation unit according to an embodiment of the present disclosure, other elements than a diode may be used.

The power supply device 120 of each node is provided with a diode used to prevent the backflow of electric current from the power supply device 120 of other node as shown in FIG. 9, and thus it is possible to prevent the backflow of electric current from the ground level that may arise when the nodes have different ground levels from each other, and the ground level between nodes can be separated.

There will be described advantageous effects obtained by allowing the power supply device 120 to be provided with a diode used to prevent the backflow of electric current from the power supply device 120 of other node.

FIGS. 10 to 12 are diagrams illustrated to describe an exemplary operation of the power transmission and reception control system using the power supply device 120 according to an embodiment of the present disclosure. FIGS. 10 to 12 illustrate three nodes n−1, n, and n+1. There is illustrated a battery of 48 V included in each of the nodes n−1, n, and n+1, for supplying the power to the network router 110.

When the power supply device 120 of the node n supplies the power to the nodes n−1 and n+1, the power is supplied from the node n to the nodes n−1 and n+1 along the path shown in FIG. 11. In other words, the direct-current power is supplied from the node n to the nodes n−1 through a set of pins #7 and #8 (Pair 7), and the direct-current power is supplied from the node n to the nodes n+1 through a set of pins #4 and #5 (Pair 4).

In normal operation, as shown in FIG. 11, the electric current flows from the power supply device 120 of the node n to the node n−1, and the electric current flows from the power supply device 120 of the node n−1 to the node n. However, for example, if the ground level of the node n is higher than that of the node n−1 (e.g., when the node n has a ground level of 10 V and the node n−1 has a ground level of 0 V), the electric current flows from the power supply device 120 of the node n to the node n−1 along the opposite path during normal operation. When the ground level is different between nodes as described above, an electric current may flow into a node from an adjacent one and the amount of flowing electric current is excessive, resulting in probably burnout of a network cable connected between nodes.

Thus, the power supply device 120 of each node is provided with a diode used to prevent the backflow of an electric current, and thus even when the ground level is different between nodes, it is possible to prevent the backflow of an electric current as shown in FIG. 12. In other words, by separating the ground level of each node, the power supply device 120 of each node can prevent an excessive current from flowing even when the ground level is different between nodes for some reasons.

2. Conclusion

According to an embodiment of the present disclosure as described above, there is provided a power supply device for supplying the direct-current power to a network router of its own node in a network in which a plurality of nodes are connected in a daisy chain. The power supply device according to an embodiment of the present disclosure is configured to be able to receive the direct-current power from an adjacent node via a network cable or supply the direct-current power to an adjacent node via a network cable.

The power supply device according to an embodiment of the present disclosure transmits and receives the direct-current power to and from an adjacent node via a network cable. Thus, when the power fails to be supplied to the network router 110 of its own node due to the failure of a battery server or the depletion of a battery in its own node, the power supply device according to an embodiment of the present disclosure allows the network router 110 of its own node to be continued to operate without interruption by receiving the power supplied from an adjacent node.

Similarly to that described above, when the power fails to be supplied to the network router 110 in an adjacent node due to the failure of a battery server or the depletion of a battery in the relevant node, the operation of the network router 110 at the relevant node can be continued by supplying the power to the adjacent node.

In the power supply device according to an embodiment of the present disclosure, a path used to receive the direct-current power from an adjacent node via a network cable is different from a path used to supply the direct-current power to the same node via a network cable. A path used to receive the direct-current power from two adjacent nodes via a network cable is different for each node. By defining paths for transmitting and receiving the direct-current power as described above, the power supply device according to an embodiment of the present disclosure is able to transmit and receive the direct-current power to and from adjacent nodes by avoiding collision of supply of power.

The power supply device according to an embodiment of the present disclosure is configured to receive the direct-current power from an adjacent node via a network cable and to supply the direct-current power to a network router. Thus, when the nodes are spaced apart from each other by a distance exceeding the maximum communicable distance, the data transmission between nodes is possible. In other words, a network router is interposed between nodes and a power supply device of a node supplies the direct-current power to the network router, and thus the data transmission between nodes is possible.

It should be understood by those skilled in the art that various modifications, combinations, sub-combinations and alterations may occur depending on design requirements and other factors insofar as they are within the scope of the appended claims or the equivalents thereof.

In addition, the effects described in the present specification are merely illustrative and demonstrative, and not limitative. In other words, the technology according to the present disclosure can exhibit other effects that are evident to those skilled in the art along with or instead of the effects based on the present specification.

The present technology may be configured as below:

(1) A power interchange system for distributing direct current (DC) electrical power, the power interchange system comprising:

a plurality of nodes comprising a first node and a second node, wherein the first node comprises a first communication device and a first power source to power the first communication device, and wherein the second node comprises a second communication device and a second power source to power the second communication device; and a wired cable connecting the first node and the second node, wherein the wired cable comprises at least one first wire to convey DC power from the first power source of the first node to the second node to power the second communication device or from the second power source of the second node to the first node to power the first communication device.

(2) The power interchange system according to (1), wherein:

the first power source comprises a first storage battery; and the second power source comprises a second storage battery.

(3) The power interchange system according to (2), wherein:

the first power source further comprises at least one first generator;

the first node is arranged to store in the first storage battery electrical energy generated by the at least one first generator;

the second power source further comprises at least one second generator; and the second node is arranged to store in the second storage battery electrical energy generated by the at least one second generator.

(4) The power interchange system according to (3), wherein:

the power interchange system further comprises a power bus to convey DC power between nodes of the plurality of nodes;

each node of the plurality of nodes comprises at least a part of at least one residential and/or commercial building and a power source to supply electrical power to electrical components of the at least the part of the at least one residential and/or commercial building of the node; and the power interchange system is adapted to distribute, via the power bus, DC power between the at least one residential and/or commercial building of each node of the plurality of nodes.

(5) The power interchange system according to (4), wherein:

the first node further comprises a first battery server to control transmission of DC power from the first node and/or receipt of DC power at the first node via the power bus, wherein the first battery server is configured to control the transmission and/or receipt in accordance with control messages received at the first battery server via the first communication device;

the second node further comprises a second battery server to control transmission of DC power from the second node and/or receipt of DC power at the second node via the power bus, wherein the second battery server is configured to control the transmission and/or receipt in accordance with control messages received at the second battery server via the second communication device; and wherein the first communication device and the second communication device are configured to send and/or receive control messages via at least one second wire of the wired cable.

(6) The power interchange system according to (5), further comprising:

a third node comprising a third communication device, a third storage battery, a third generator, and a third battery server; and a second wired cable connecting the first node and the third node, wherein the second wired cable comprises at least one third wire to convey power from the first power source of the first node to the third node to power the third communication device and from the third power source of the third node to the first node to power the first communication device;

wherein the second wired cable comprises at least one fourth wire; and wherein the first communication device and the third communication device are configured to send and/or receive control messages via at least one fourth wire of the second wired cable.

(7) The power interchange system according to any one of (1) to (6), wherein:

the power interchange system further comprises a power bus to convey DC power between nodes of the plurality of nodes;

each node of the plurality of nodes comprises a communication device to transmit and/or receive control messages to control distribution of DC power via the power bus; and the communication devices of the plurality of nodes are communicatively linked in a chain, wherein communication devices of adjacent nodes in the chain are directly connected via the wired cable.

(8) The power interchange system according to any one of (1) to (7), wherein: the wired cable comprises at least one second wire to convey network messages; the first communication device comprises a network port and the at least one second wire is connected to the network port; and the first communication device comprises a power supply terminal and the at least one first wire is connected to the power supply terminal.

(9) The power interchange system according to any one of (1) to (8), wherein the at least one first wire is connected to the first communication device via at least one diode.

(10) The power interchange system according to any one of (1) to (10), wherein:

the at least one first wire is arranged to convey DC power at a first voltage level;

the first communication device is arranged to receive input power at a second voltage level that is different from the first voltage level; and the first node comprises a DC-to-DC voltage converter, the DC-to-DC voltage converter being connected to the first communication device and to the at least one first wire.

(11) The power interchange system according to any one of (1) to (10), wherein the wired cable is a 10Base-T cable.

(12) The power interchange system according to any one of (1) to (12), wherein:

the first communication device is a first network router; and the second communication device is a second network router.

(13) A method of operating a first node of a power interchange system comprising a plurality of nodes, each node of the plurality of nodes comprising a communication device and a storage battery, the method comprising:

supplying power from a first storage battery of the first node to a first communication device of the first node; and in a case that power from the first storage battery is unavailable to power the first communication device, receiving power at the first node from a second storage battery of a second node and powering the first communication device using power from the second storage battery.

(14) The method according to (13), wherein receiving power at the first node from the second storage battery of the second node in a case that power from the first storage battery is unavailable to power the first communication device comprises receiving power at the first node from the second storage battery of the second node when the first storage battery is depleted.

(15) The method according to any one of (13) to (14), wherein:

the first node further comprises a first battery server regulating distribution of power in the first node, to the first node from the power interchange system, and from the first node to the power interchange system; and receiving power at the first node from the second storage battery of the second node when power available from the first storage battery is unavailable to power the first communication device comprises receiving power at the first node from the second storage battery of the second node when the first battery server has failed.

(16) The method according to any one of (13) to (15), wherein:
receiving power at the first node from the second storage battery of the second node comprises receiving power at the first node via at least one first wire of a network cable directly connecting the first communication device to a second communication device of the second node; and
the network cable further comprises at least one second wire to convey control messages relating to distribution of power in the power interchange system between the first communication device and the second communication device.

(17) The method according to (16), wherein receiving power at the first node via the at least one first wire of the network cable further comprises receiving the power via a DC-to-DC voltage converter connected between the at least one first wire and the first communication device.

(18) An apparatus to transmit and/or receive power in a power interchange system, the apparatus comprising:
a communication device;
a power source connected to the communication device to power the communication device;
a power terminal to transmit DC power to the power interchange system from the power source and/or to receive DC power from the power interchange system, the power terminal being connected to the power source; and
a network terminal to transmit and/or receive control signals relating to transmission and/or receipt of power via the power interchange system and to receive DC power via the power interchange system, the network terminal being connected to at least one network port of the communication device and to a power supply of the communication device.

(19) The apparatus according to (18), wherein:
the network terminal comprises at least one pin by which to receive the DC power from the power interchange system; and
the apparatus further comprises at least one diode connecting the at least one pin to the power supply of the communication device.

(20) The apparatus according to (19), further comprising:
at least one DC-to-DC voltage converter connecting the at least one pin to the power supply of the communication device.

(21) The apparatus according to any one of (18) to (20), further comprising:
a battery server to control transmission of DC power to the power interchange system from the power source and/or receipt of DC power from the power interchange system in accordance with the control signals.

(22) An electrical component for use with a power interchange system, the power interchange system distributing direct current (DC) electrical power, the electrical component comprising:
a power input terminal to receive power from a storage battery; and
a cable terminal to connect to a wired cable of the power interchange system, the wired cable comprising a plurality of wires and the cable terminal comprising a plurality of pins, the plurality of pins comprising at least one first pin and at least one second pin, wherein the electrical component is configured to receive via the at least one first pin signals relating to the power interchange system and wherein the electrical component is configured to receive via the at least one second pin DC power,
wherein the electrical component is configured to draw power from the at least one second pin in a case that power is unavailable via the power input terminal.

REFERENCE SIGNS LIST 20 direct-current bus line
30 network cable
100a to 100d battery server
110 network router
120 power supply device
130a to 130f connector
140 DC-to-DC converter

The invention claimed is:

1. A power interchange system for distributing direct current (DC) electrical power, the power interchange system comprising:
a plurality of nodes comprising a first node and a second node, wherein the first node comprises a first communication device and a first power source to power the first communication device, and wherein the second node comprises a second communication device and a second power source to power the second communication device; and
a wired cable connecting the first node and the second node, wherein the wired cable comprises at least one first wire to convey DC power from the first power source of the first node to the second node to power the second communication device or from the second power source of the second node to the first node to power the first communication device.

2. The power interchange system of claim 1, wherein:
the first power source comprises a first storage battery; and
the second power source comprises a second storage battery.

3. The power interchange system of claim 2, wherein:
the first power source further comprises at least one first generator;
the first node is arranged to store in the first storage battery electrical energy generated by the at least one first generator;
the second power source further comprises at least one second generator; and
the second node is arranged to store in the second storage battery electrical energy generated by the at least one second generator.

4. The power interchange system of claim 3, wherein:
the power interchange system further comprises a power bus to convey DC power between nodes of the plurality of nodes;
each node of the plurality of nodes comprises at least a part of at least one residential and/or commercial building and a power source to supply electrical power to electrical components of the at least the part of the at least one residential and/or commercial building of the node; and
the power interchange system is adapted to distribute, via the power bus, DC power between the at least one residential and/or commercial building of each node of the plurality of nodes.

5. The power interchange system of claim 4, wherein:
the first node further comprises a first battery server to control transmission of DC power from the first node and/or receipt of DC power at the first node via the power bus, wherein the first battery server is configured to control the transmission and/or receipt in accordance with control messages received at the first battery server via the first communication device;
the second node further comprises a second battery server to control transmission of DC power from the second node and/or receipt of DC power at the second node via the power bus, wherein the second battery server is configured to control the transmission and/or receipt in accordance with control messages received at the second battery server via the second communication device; and wherein the first communication device and the second communication device are configured to send and/or receive control messages via at least one second wire of the wired cable.

6. The power interchange system of claim 5, further comprising:
a third node comprising a third communication device, a third storage battery, a third generator, and a third battery server; and
a second wired cable connecting the first node and the third node, wherein the second wired cable comprises at least one third wire to convey power from the first power source of the first node to the third node to power the third communication device and from the third power source of the third node to the first node to power the first communication device;
wherein the second wired cable comprises at least one fourth wire; and
wherein the first communication device and the third communication device are configured to send and/or receive control messages via at least one fourth wire of the second wired cable.

7. The power interchange system of claim 1, wherein:
the power interchange system further comprises a power bus to convey DC power between nodes of the plurality of nodes;
each node of the plurality of nodes comprises a communication device to transmit and/or receive control messages to control distribution of DC power via the power bus; and
the communication devices of the plurality of nodes are communicatively linked in a chain, wherein communication devices of adjacent nodes in the chain are directly connected via the wired cable.

8. The power interchange system of claim 1, wherein:
the wired cable comprises at least one second wire to convey network messages;
the first communication device comprises a network port and the at least one second wire is connected to the network port; and
the first communication device comprises a power supply terminal and the at least one first wire is connected to the power supply terminal.

9. The power interchange system of claim 1, wherein the at least one first wire is connected to the first communication device via at least one diode.

10. The power interchange system of claim 1, wherein:
the at least one first wire is arranged to convey DC power at a first voltage level;
the first communication device is arranged to receive input power at a second voltage level that is different from the first voltage level; and
the first node comprises a DC-to-DC voltage converter, the DC-to-DC voltage converter being connected to the first communication device and to the at least one first wire.

11. The power interchange system of claim 1, wherein the wired cable is a 10Base-T cable.

12. The power interchange system of claim 1, wherein:
the first communication device is a first network router; and the second communication device is a second network router.

13. A method of operating a first node of a power interchange system comprising a plurality of nodes, each node of the plurality of nodes comprising a communication device and a storage battery, the method comprising:
supplying power from a first storage battery of the first node to a first communication device of the first node; and
in a case that power from the first storage battery is unavailable to power the first communication device, receiving power at the first node from a second storage battery of a second node and powering the first communication device using power from the second storage battery.

14. The method of claim 13, wherein receiving power at the first node from the second storage battery of the second node in a case that power from the first storage battery is unavailable to power the first communication device comprises receiving power at the first node from the second storage battery of the second node when the first storage battery is depleted.

15. The method of claim 13, wherein:
the first node further comprises a first battery server regulating distribution of power in the first node, to the first node from the power interchange system, and from the first node to the power interchange system; and
receiving power at the first node from the second storage battery of the second node when power available from the first storage battery is unavailable to power the first communication device comprises receiving power at the first node from the second storage battery of the second node when the first battery server has failed.

16. The method of claim 13, wherein:
receiving power at the first node from the second storage battery of the second node comprises receiving power at the first node via at least one first wire of a network cable directly connecting the first communication device to a second communication device of the second node; and
the network cable further comprises at least one second wire to convey control messages relating to distribution of power in the power interchange system between the first communication device and the second communication device.

17. The method of claim 16, wherein receiving power at the first node via the at least one first wire of the network cable further comprises receiving the power via a DC-to-DC voltage converter connected between the at least one first wire and the first communication device.

18. An apparatus to transmit and/or receive power in a power interchange system, the apparatus comprising:
a communication device;
a power source connected to the communication device to power the communication device;
a power terminal to transmit DC power to the power interchange system from the power source and/or to receive DC power from the power interchange system, the power terminal being connected to the power source; and
a network terminal to transmit and/or receive control signals relating to transmission and/or receipt of power via the power interchange system and to receive DC power via the power interchange system, the network terminal being connected to at least one network port of the communication device and to a power supply of the communication device.

19. The apparatus of claim 18, wherein:
the network terminal comprises at least one pin by which to receive the DC power from the power interchange system; and
the apparatus further comprises at least one diode connecting the at least one pin to the power supply of the communication device.

20. The apparatus of claim 19, further comprising:
at least one DC-to-DC voltage converter connecting the at least one pin to the power supply of the communication device.

21. The apparatus of claim 18, further comprising:
a battery server to control transmission of DC power to the power interchange system from the power source and/or receipt of DC power from the power interchange system in accordance with the control signals.

22. An electrical component for use with a power interchange system, the power interchange system distributing direct current (DC) electrical power, the electrical component comprising:

a power input terminal to receive power from a storage battery; and a cable terminal to connect to a wired cable of the power interchange system, the wired cable comprising a plurality of wires and the cable terminal comprising a plurality of pins, the plurality of pins comprising at least one first pin and at least one second pin, wherein the electrical component is configured to receive via the at least one first pin signals relating to the power interchange system and wherein the electrical component is configured to receive via the at least one second pin DC power, wherein the electrical component is configured to draw power from the at least one second pin in a case that power is unavailable via the power input terminal.

* * * * *